Oct. 3, 1961   G. R. NELSON   3,002,414
FASTENER HAVING TOOL CENTERING, GEAR OPERATED, DRIVING CONTACT
Filed March 27, 1958
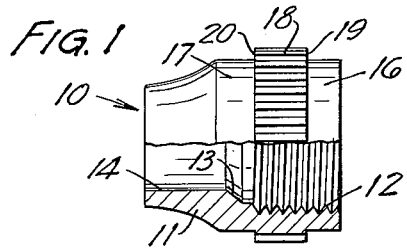
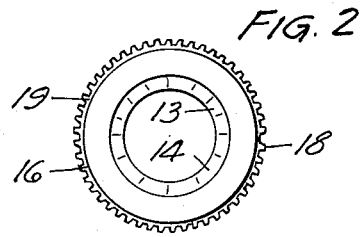
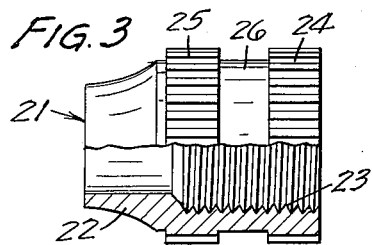
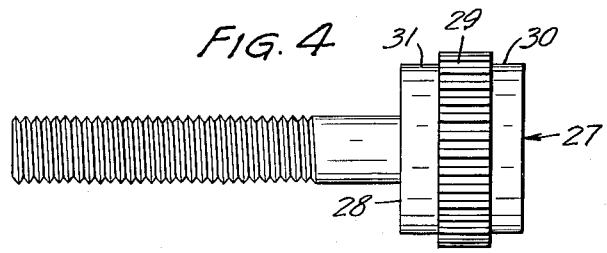
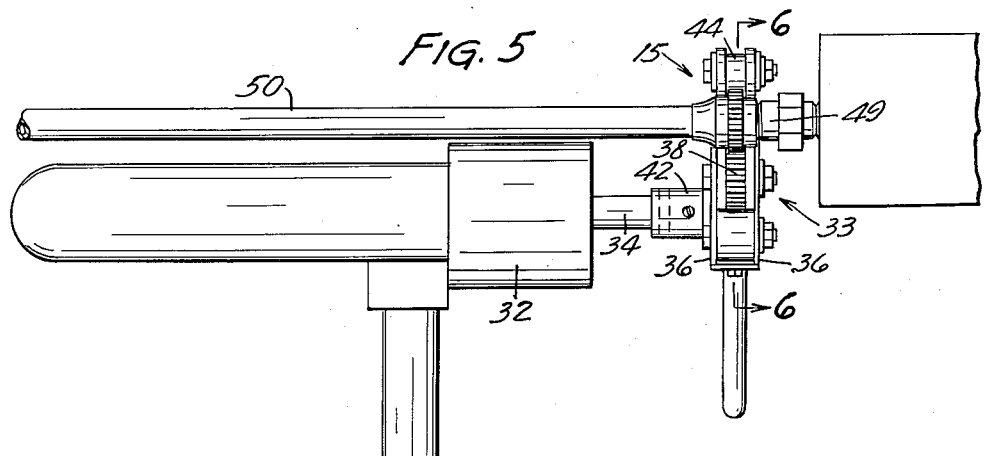
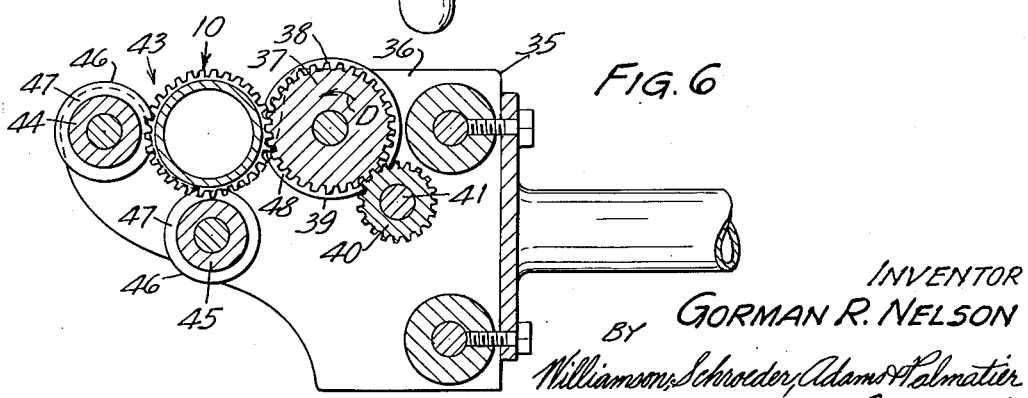
INVENTOR
GORMAN R. NELSON
BY Williamson, Schroeder, Adams & Palmatier
ATTORNEYS

United States Patent Office 3,002,414
Patented Oct. 3, 1961

3,002,414
FASTENER HAVING TOOL CENTERING, GEAR OPERATED, DRIVING CONTACT
Gorman R. Nelson, 2512 S. Summit, Sioux Falls, S. Dak.
Filed Mar. 27, 1958, Ser. No. 724,351
3 Claims. (Cl. 85—9)

This invention relates to a threaded securing device which is adapted for high speed operation, and more specifically relates to such a device which is adapted for coupling to a high speed torquing tool.

This application comprises a continuation-in-part of my co-pending application for United States Letters Patent filed April 26, 1956, S.N. 580,745, now U.S. Patent No. 2,859,649, and entitled Coupling Nut and Hand Tool for Turning the Same, and also of my other copending application for United States Letters Patent filed April 26, 1956, S.N. 580,746, now U.S. Patent No. 2,863,347, and entitled Coupling Nut and Torque Transmitting Tool Therefor.

An object of my invention is to provide a new and improved threaded securing device of simple and inexpensive construction and operation which is adapted for high speed spinning into and out of article-holding position.

Another object of my invention is the provision of a securing device having improved means for coupling to a tool for operating the device.

A further object of my invention is the provision in a threaded securing device of means for permitting coupling of a turning tool thereto in predetermined orientation so as to provide a secure connection between the tool and the device until the turning operation is complete.

A still further object of the invention is to provide on a threaded securing device, novel and improved means for coupling a turning tool thereto in such a manner that endwise alignment of the tool with the securing device is unnecessary.

These and other objects and advantages of my invention will more fully appear from the following description made in connection with the accompanying drawings wherein like reference characters refer to the same or similar parts throughout the several views and in which:

FIG. 1 is a side elevation view, partly broken away, of a coupling nut for pipe conduits and the like which incorporates the present invention and which is illustrative of the type of nuts which are used in such a manner that the tool for turning the nut must be applied over one side of the nut;

FIG. 2 is an end elevation view of the nut shown in FIG. 1;

FIG. 3 is a side elevation view, partly broken away, of a coupling nut employing a slightly modified form of the means for coupling a tool therein;

FIG. 4 is a side elevation view of another type of securing device incorporating the present invention.

FIG. 5 is a top plan view showing the nut of FIGS. 1 and 2 in use and showing a torquing tool applied thereto for spinning the nut at high speed;

FIG. 6 is a detail section view taken on a plane as indicated substantially at 6—6 in FIG. 5.

The securing device shown in FIGS. 1 and 2 and indicated in general by numeral 10 comprises a coupling nut for hydraulic conduit and the like and includes a substantially annular body 11 which is threaded at 12 along one portion of the interior periphery thereof, and the interior periphery is also flared at 13 and the other end portion 14 of the internal periphery is smooth and cylindrically shaped.

Means are provided on the external periphery of the body 11 to facilitate coupling of a high speed torquing tool, indicated in general by numeral 15, thereto. In the form shown, such means include a pair of smooth and cylindrical, and outwardly facing surfaces 16 and 17 respectively disposed adjacent the end portions of the external periphery and concentric of the rotation axis of the nut 10. A plurality of externally projecting teeth 18 are also formed in the external periphery of the body 11 and are disposed between the cylindrical bearing surfaces 16 and 17. The body 11 is also provided with peripheral surfaces 19 and 20 at the opposite ends of the teeth 18. It will be noted that the surfaces 19 and 20 respectively face in opposite directions endwise of the body 11 and are disposed in planes which lie normal to the rotation axis.

It will therefore be seen that the body has a two-part tool-engaging external periphery concentric of the rotation axis wherein one part includes the end portions or smoothly surfaced portions 16 and 17 of the external periphery and the other part includes the intermediate toothed portion 18 of the external periphery. One form of tool which may be quickly coupled to the nut 10 is hereinafter described.

The securing device shown in FIG. 3 and indicated in general by numeral 21 is similar to the securing device or nut 10, and includes a generally annular body member 22 which is threaded in its internal periphery 23 and has on its external periphery, a pair of externally toothed portions 24 and 25 which are concentric of the nut rotation axis and are disposed adjacent the opposite ends of the external periphery. A smooth and cylindrical outwardly facing bearing surface 26 is also formed on the outer periphery of the body 22 between the toothed portions 24 and 25.

The securing device indicated in general by numeral 27 and shown in FIG. 4, comprises a bolt having a body 28 with a threaded shank 29 formed integrally therewith and projecting in an endwise direction and concentric of the rotation axis. The external periphery of the body 28 is formed substantially identical to the external periphery of the nut 10 and is provided with a pair of smooth and cylindrical, outwardly facing bearing surfaces 30 and 31 adjacent the opposite ends of the body 28 and disposed in concentric relation with the rotation axis. The external periphery also has a plurality of externally projecting gear teeth 29 concentric of the rotation axis and disposed intermediate the cylindrical end surfaces 30 and 31.

The apparatus 15 which is shown for purposes of fully describing the manner of operation of the securing devices such as nuts 10 and 21 and bolt 27, includes a source of rotary power such as a predetermined torque release wrench 32 which is fully disclosed in my United States Patent No. 2,687,054 issued August 24, 1954, and a torque-transmitting device or tool, which is indicated in general by numeral 33 and is fully disclosed in detail in my previously mentioned co-pending application S.N. 580,746, which is attached to the driving spindle 34 of the wrench 32. The tool 33 includes a frame structure 35 which has a pair of rigidly interconnected side plates 36. A nut-engaging rotary driving wheel 37 is journalled on the plates 36 and has a plurality of external driving teeth 38 formed in the outer periphery thereof between a pair of axially spaced cylindrical bearing surfaces 39 which are disposed radially outwardly a small distance from the external terminae of teeth 38. The teeth 38 are of such size and spacing as to mesh with the teeth 18 on nut 10. Wheel 37 is meshed with an externally toothed rotary gear 40 which is affixed to the drive shaft 41 which is journalled in and extends through the frame plates 36 and is affixed to a coupling sleeve 42 which is non-rotatably, but releasably connected with the driving spindle 34 of the wrench 32.

The tool 15 also has a nut-cradling structure, indicated in general by numeral 43 which includes a pair of flanged nut-supporting rollers 44 and 45, the peripheral flange surfaces 46 of which are positioned to engage the cylindrical surfaces 16 and 17 of the nut 10, and the inner opposed flange surfaces 47 of which are spaced from each other for engaging the end surfaces 19 and 20 of teeth 18 in the nut 10. When the tool 33 is coupled with the nut 10, the teeth 38 of driving wheel 37 mesh with the teeth 18 of the nut and the cylindrical bearing surfaces 39 of the driving wheel 37 bear against the cylindrical surfaces 16 and 17 of nut 10. The bearing surfaces 16 and 17 of the nut 10 also engage the peripheral surfaces 46 of the flanged rollers 44 and 45 to be cradled thereby and retained in driving relation with the drive wheel 37. Inner flange surfaces 47 of the rollers 44 and 45, and the axially facing surfaces 48 of the driving wheel 37 engage the end surfaces 19 and 20 of the teeth 18 to retain the tool 33 in a predetermined orientation with respect to the nut 10. When rotary power is applied through the tool 33 to revolve the driving wheel 37 in the direction of arrow D, the nut 10 has revolved at a rapid speed for spinning the nut and rapidly moving the same along the fitting 49 to which it is threadedly secured and to either draw the conduit 50 toward the fitting 49 or to release the conduit from the fitting 49, depending upon the pitch of the threads in relation to the direction of rotation.

It will be understood that the bolt 27 shown in FIG. 4 may be spun at a rapid rate into or out of article-holding position by the apparatus 15 incorporating the identical tool 33.

The nut 21 shown in FIG. 3 is substantially similar to the nut 10, but involves the reverse positioning of the external teeth and the cylindrical bearing surface. The tool for driving the nut 21 will be similar to the tool 33 and will have the identical operational effect. The tool would necessarily have a driving wheel with gear teeth aligned with the teeth 24 and 25 of the nut 21 and the bearing surfaces of the driving wheel and of the guide rollers would necessarily be reoriented to a position intermediate the ends of the rollers and wheel so that the side surfaces of the flanges of these rollers and wheel would engage the inner end surfaces of the teeth 24 and 25 which face in opposite directions.

It will be seen that I have provided a new and improved rotary securing device which may be securely coupled to a high speed source of rotary power in a predetermined orientation so as to facilitate high speed spinning of the securing device into or out of article-holding position.

It will, of course, be understood that various changes may be made in the form, detail, arrangement and proportion of the parts without departing from the scope of my invention which consists of the matter described herein and set forth in the appended claims.

What I claim is:

1. A rotatable securing device to be rapidly spun into and out of article-holding position, comprising a body having a longitudinal axis, said body having a threaded portion extending longitudinally of the body and in concentric relationship to the longitudinal axis, said body also including an external peripherally extending tool-engaging portion, said tool-engaging portion being formed outwardly of said threaded portion with respect to said longitudinal axis and extending longitudinally of said body, said tool-engaging portion including at least three contiguous annular portions extending completely around the tool-engaging portion, two of said annular portions being of substantially identical construction, the other annular portion being of a different construction and being positioned immediately between said identical portions, one of said annular portions defining a smooth cylindrical outer surface for engaging a torquing tool associated with the device, another one of said annular portions defining peripherally extending gear teeth completely therearound, the edge portions of the intermediate annular portion being connected with the adjacent edge portions of the contiguous annular portions by peripherally extending surfaces extending completely around the body, said peripherally extending surfaces lying in substantially parallel planes disposed substantially normally to the longitudinal axis of the body, at least one side edge of each of said gear teeth being disposed in one of said planes, whereby a torquing tool may be seated in predetermined orientation with respect to the body, and said peripherally extending surfaces are adapted to limit the relative movement of the body means in the direction of the longitudinal axis thereof with respect to the associated tool.

2. A coupling nut to be rapidly spun into and out of article-holding position, comprising a body having a longitudinal axis, said body having a bore formed therethrough, a first end portion of said bore being smooth and substantially cylindrically shaped, the opposite end portion of said bore being of larger diameter than said first portion and having an internal thread formed therein, the first portion of said bore being connected with the second portion of said bore by an intermediate flared portion to define a relatively thin-walled hollow body, said body also including an external peripherally extending tool-engaging portion, said tool-engaging portion being formed outwardly of said bore with respect to said longitudinal axis and extending longitudinally of said body, said tool-engaging portion including at least three contiguous annular portions extending completely around the tool-engaging portion, two of said annular portions being of substantially identical construction, the other annular portion being of a different construction and being positioned immediately between said identical portions, one of said annular portions defining a smooth cylindrical outer surface for engaging a torquing tool associated with the device, another one of said annular portions defining peripherally extending gear teeth completely therearound, the edge portions of the intermediate annular portion being connected with the adjacent edge portions of the contiguous annular portions by peripherally extending surfaces extending completely around the body, said peripherally extending surfaces lying in substantially parallel planes disposed substantially normally to the longitudinal axis of the body, at least one side edge of each of said gear teeth being disposed in one of said planes, whereby a torquing tool may be seated in predetermined orientation with respect to the body, and said peripherally extending surfaces are adapted to limit the relative movement of the body means in the direction of the longitudinal axis thereof with respect to the associated tool.

3. A bolt to be rapidly spun into and out of article-holding position, comprising a body having a longitudinal axis, a shank formed integrally with said body and projecting in an endwise direction concentric with said longitudinal axis, said shank having an external screw thread formed thereon, said body also including an external peripherally extending tool-engaging portion, said tool-engaging portion being formed outwardly of said threaded shank with respect to said longitudinal axis and extending longitudinally of said body, said tool-engaging portion including at least three contiguous annular portions extending completely around the tool-engaging portion, two of said annular portions being of substantially identical construction, the other annular portion being of a different construction and being positioned immediately between said identical portions, one of said annular portions defining a smooth cylindrical outer surface for engaging a torquing tool associated with the device, another one of said annular portions defining peripherally extending gear teeth completely therearound, the edge portions of the intermediate annular portion being connected with the adjacent edge portions of the contiguous annular portions by peripherally extending surfaces extending completely around the body, said peripherally extending surfaces lying in substantially parallel planes disposed substantially normally to the longitudinal axis of the body, at least one side edge of each of said gear teeth being disposed in one of said planes, whereby a torquing tool may be seated in predetermined orientation with respect to the body, and said peripherally extending surfaces are adapted to limit the relative movement of the body means in the direction of the longitudinal axis thereof with respect to the associated tool.

References Cited in the file of this patent

UNITED STATES PATENTS

| | | |
|---|---|---|
| 1,185,788 | Ford | June 6, 1916 |
| 2,455,368 | Hoffar | Dec. 7, 1948 |
| 2,704,426 | Macauley | Mar. 22, 1955 |